United States Patent [19]

Fiden

[11] Patent Number: 4,980,690
[45] Date of Patent: Dec. 25, 1990

[54] BISTATIC RADAR SEEKER WITH RANGE GATING

[75] Inventor: William H. Fiden, Los Angeles, Calif.

[73] Assignee: Hughes Aircraft Company, Los Angeles, Calif.

[21] Appl. No.: 426,911

[22] Filed: Oct. 24, 1989

[51] Int. Cl.[5] .......................... G01S 13/18; F41G 7/00
[52] U.S. Cl. .......................................... 342/62; 342/94
[58] Field of Search .................... 342/62, 94, 453, 458, 342/95; 244/3.14, 3.19

[56] References Cited

U.S. PATENT DOCUMENTS

| | | | |
|---|---|---|---|
| 2,950,477 | 8/1960 | Alpers | 342/62 |
| 3,781,885 | 12/1973 | Hassencahl | 342/95 |
| 4,216,472 | 8/1980 | Albanose | 342/62 |

OTHER PUBLICATIONS

"Improved Radar Designs Outwit Complex Threats", Microwaves, vol. 15, No. 4, pp. 54–71, Apr. 76.

Primary Examiner—Gilberto Barrón, Jr.
Attorney, Agent, or Firm—C. D. Brown; R. M. Heald; W. Denson-Low

[57] ABSTRACT

A semi-active radar receiver for receiving a sequence of radar pulses and providing radar timing signals in response thereto. In a most general sense, the semi-active receiver of the present invention includes a receiver 10 for receiving a direct transmission of a series of pulses from a radar transmitter 2 and for providing a series of first signal pulses in response thereto. A range gate generator 42 is included for processing the series of first pulses to provide said radar timing signals. In a more specific embodiment, the receiver includes a filter 40 for processing said received pulses and deriving estimates of the timing of the receipt thereof. The estimates are then used by the range gate generator 42 to provide said radar timing signals.

13 Claims, 4 Drawing Sheets

BISTATIC RADAR SEEKER WITH RANGE GATING

BACKGROUND OF THE INVENTION

1. Field of the Invention

The present invention relates to radar systems. More specifically, the present invention relates to techniques for improving the performance of semi-active radar systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Semi-active radar systems include a transmitter on one platform and a receiver on another. Continuous and pulsed waveforms are currently used for semi-active radar transmission. The continuous wave (CW) technique involves the continuous transmission of a radar signal which is reflected off a target and received by the receiver on the second platform.

Pulsed transmission offers certain performance advantages over CW and involves the transmission of a sequence of radar pulses.

To secure the advantages of the pulse transmission, current semi-active designs operate asynchronously. Unfortunately, this mode of operation requires the receiver to be open to receive on a continuous basis. This impairs the noise performance of the system. To circumvent this problem, range gating of the receiver has been employed with limited success.

Range gating involves opening the receiver only when a return is expected from the target. This requires some indication of range to the target. Accurate range determination requires some facility for matching radar returns with the transmitted signal. Hence, range determination requires some knowledge of the timing of the transmitted signal. The current technique for acquiring critical timing data involves the processing the centerline frequency of the transmitted signal. While acquisition of timing data in a CW transmission scheme may be somewhat straightforward, it is problematic for pulse transmission schemes.

Thus, there is a need in the art for a semi-active radar receiver effective in the receipt of pulsed radar returns. More specifically, there is a need in the art for a semi-active radar receiver with means for providing some indication of the timing of the receipt of the transmitted pulse relative to the receipt of the return pulse and thereby provide a range determination.

SUMMARY OF THE INVENTION

The need in the art is addressed by the present invention which provides a semi-active radar receiver for receiving a sequence of radar pulses and providing radar timing signals in response thereto. In a most general sense, the semi-active receiver of the present invention includes a receiver for receiving a direct transmission of a series of pulses from a radar transmitter and for providing a series of first signal pulses in response thereto. A range gate generator is included for processing the series of first pulses to provide said radar timing signals. In a more specific embodiment, the receiver includes a filter for processing said received pulses and deriving estimates of the timing of the receipt thereof. The estimates are then used by the range gate generator to provide said radar timing signals.

In a specific implementation of the invention, a separate receiver is connected to a rear pointing antenna to receive the direct path signal from the transmitter. The receiver serves to detect the time of arrival of each transmitter pulse at the missile. The detected time of arrival is used for two functions. One function involves the provision of a blanking pulse to the seeker front end. This prevents the transmitter main beam signal from feeding through seeker antenna side and back lobes and causing saturation of the seeker receiver and desensitization of the receiver during its recovery from a strong input signal. The other function of the detected time of arrival of the transmitter direct path signal is to provide a timing reference for range gates. These range gates are referenced to the detected direct path pulses with a time delay that can be adjusted for different ranges to the target.

DESCRIPTION OF THE INVENTION

Figure 1:
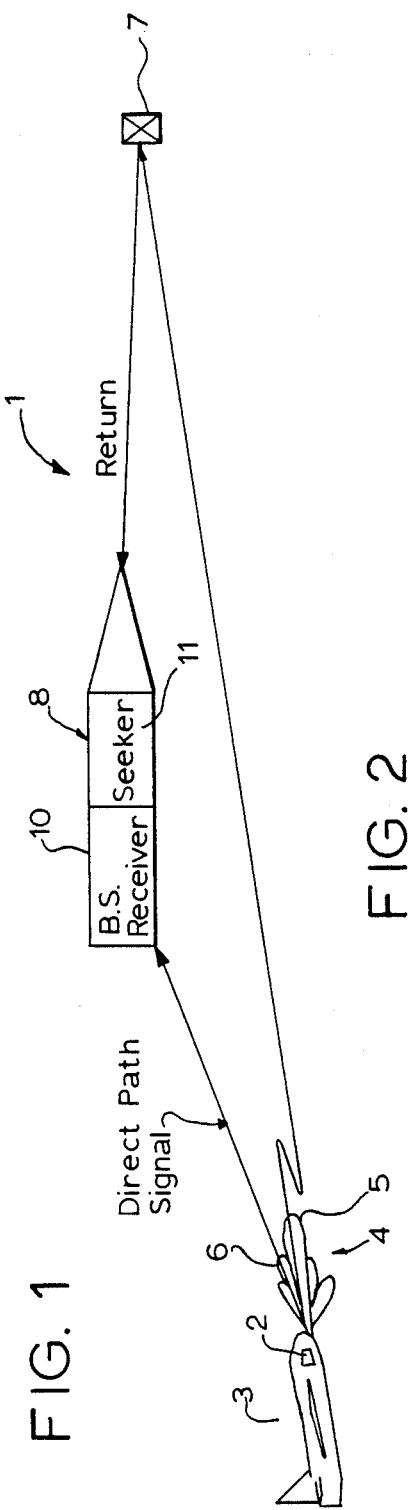
FIG. 1 is a simplified diagram illustrative of the operation of a semi-active or bistatic radar system 1 incorporating the bistatic receiver 10 of the present invention.

FIG. 1 is a simplified diagram illustrative of the operation of a semi-active or bistatic radar system 1 incorporating the bistatic receiver 10 of the present invention. The system 1 includes a radar transmitter or illuminator 2 mounted on a first platform 3. The transmitter 2 generates a output beam 4 with a mainlobe 5 and a plurality of sidelobes 6. The mainlobe 5 illuminates a target 7 and the return is received by a radar seeker 11 mounted on a second platform 8. The first and second platforms may be airborne or aquatic vehicles. Meanwhile, a direct path signal is transmitted to the second platform 8 via one or more of the sidelobes 6. The direct path signal is received by the bistatic receiver 10 of the present invention, which is also mounted on the second platform 8. As discussed more fully below, the bistatic receiver receives the direct path radar signal, along with information along a data link, and provides radar timing signals to the radar seeker 11. The radar seeker 11 uses this information to generate range gates within which to place the radar return received thereby. The radar timing signals provided by the bistatic receiver 10 are also used to provide blanking signals for the seeker receiver.

Figure 2:
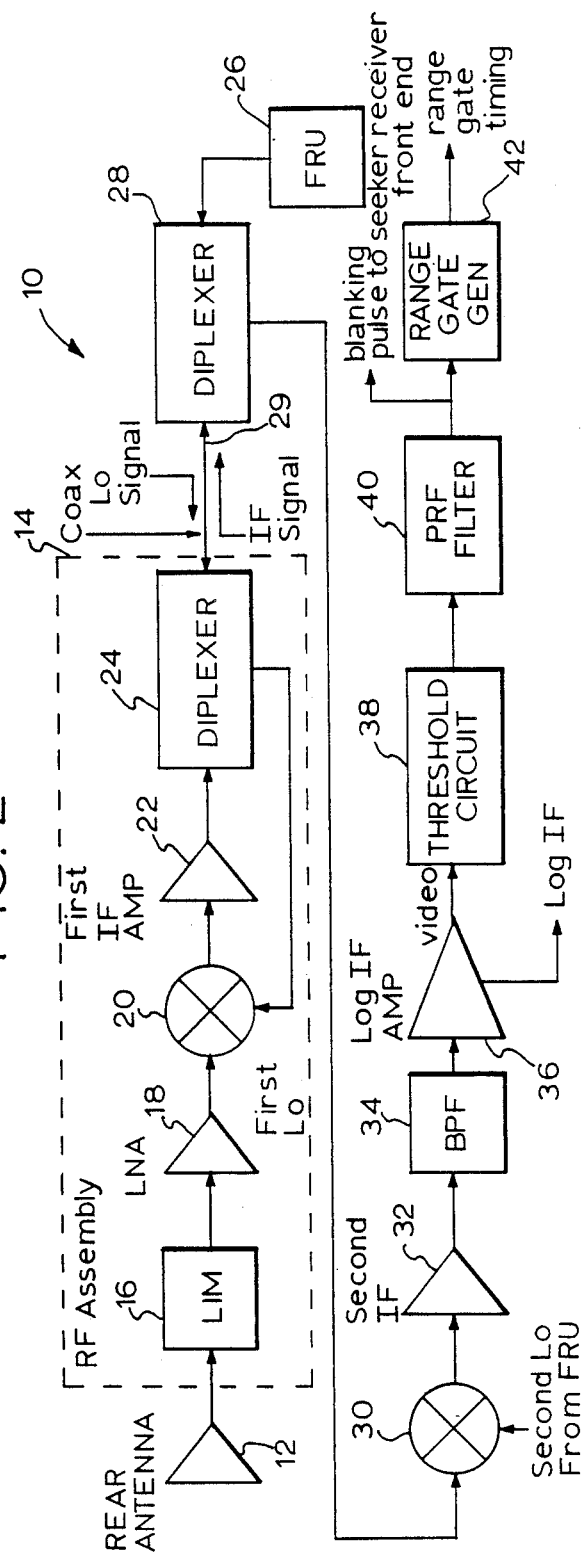
FIG. 2 is an illustrative implementation of the bistatic receiver of the present invention.

FIG. 2 is an illustrative implementation of the bistatic receiver 10 of the present invention. The invention contemplates the use of a second receiver mounted at the second platform 8 which is independent from the radar seeker 11 and capable of receiving a direct path signal from the radar transmitter 2. Hence, an antenna 12 is provided at the rear of the second platform 8. The rear antenna 12 provides a radio frequency (RF) feed to an illustrative RF assembly 14. The RF assembly 14 includes a limiter 16, a low noise amplifier 18, a first mixer/demodulator 20, an IF amplifier 22 and a first diplexer 24. The radar transmitter 2 transmits a sequence of pulses which are received by the antenna 12. The limiter 16 restricts the amplitude of the received RF pulses. The limited signals are amplified by the low noise amplifier 18 and demodulated by the mixer 20 using a reference local oscillator (LO) signal from a frequency reference unit (FRU) 26 via a second diplexer 28, a coaxial cable 29, and the first diplexer 24. The RF signals are mixed down to IF by the mixer 20, then amplified by the IF amplifier 22. The IF signal pulses are transmitted forward along the platform 8 via the first diplexer 24 and the coaxial cable 29. As is known in the art, the diplexers 24 and 28 allow for the two-way transmission of signals along the coaxial cable 29. In addition to receiving a reference signal from the FRU 26, the second diplexer 28 also provides the IF signals to a second mixer 30. The second mixer 30 provides second IF signals to a second IF amplifier 32 for amplification. The output of the second IF amplifier 32 is filtered by a bandpass filter 34. The output of the bandpass filter 34 input to a log IF amplifier 36.

As is known in the art, the log IF amplifier 36 is well adapted for signals, such as the direct path signals, having a wide dynamic range. The large dynamic range of the direct path signals can result from the main lobe 5 or the side lobes 6 and can rapidly change with the position of the beam 4 relative to the platform 8. The log IF amplifier 36 provides two outputs, a baseband (video) output and a log IF output. The log IF amplifier 36 supplies the log video signal for pulse detection and a log IF signal which can be used for the data link function. Hence, the log IF output is provided to equipment associated with a data link (not shown).

The pulses contained in the log video signals are detected by a threshold circuit 38 and supplied to a PRF filter 40. The PRF filter 40 is a digital filter operating on a sequence of detected pulses to provide an output pulse having a timing accuracy based on a number of previously detected pulses. The output pulse of the filter 40 precedes the actual received pulse so that the seeker receiver front end (not shown) can be effectively blanked during the presence of the direct path signal pulse of the transmitter 2. This provides some measure of protection for the seeker receiver front end. In addition, the output of the filter 40 is used to control the timing of a range gate generator 42. Thus, the range gate timing is related to the time of arrival of the transmitter 2 direct path signal (shown in FIG. 1).

The PRF filter 40 may be a bandpass filter or a phase lock loop which simply averages the received signal pulse arrival times to provide an estimate of the time of arrival of the next pulse. In the preferred embodiment, the filter 40 is implemented as a digital (e.g. Kalman) filter running an algorithm to provide a more accurate estimate of the timing of the next pulse. Those skilled in will be able to design an appropriate filter for a given application without undue experimentation.

Figure 3:
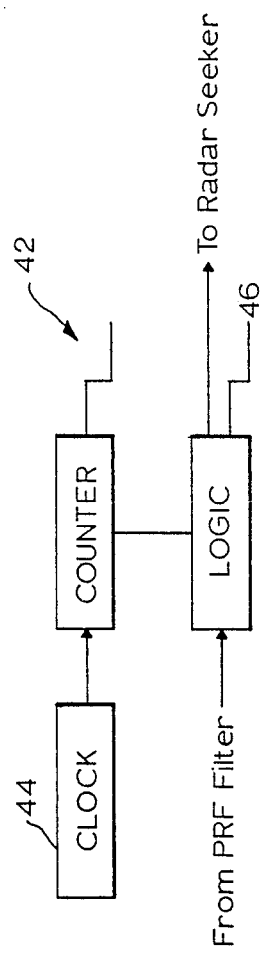
FIG. 3 is an illustrative implementation of the range gate generator utilized in the bistatic receiver of the present invention.

FIG. 3 is an illustrative implementation of the range gate generator 42 utilized in the bistatic receiver 10 of the present invention. As shown, the range gate generator 42 may be implemented with a clock 44, a counter 46 and logic 48. The counter 46 counts pulses from the clock between the receipt of pulses from the PRF filter 40 under the control of a logic circuit 48. The logic circuit 48 recognizes certain counts in the counter 46 and establishes certain events. The logic 48 may be implemented with coincidence gates, read-only-memory, or shift registers with discrete logic as is well within the purview of one of ordinary skill in the art.

Figure 4:
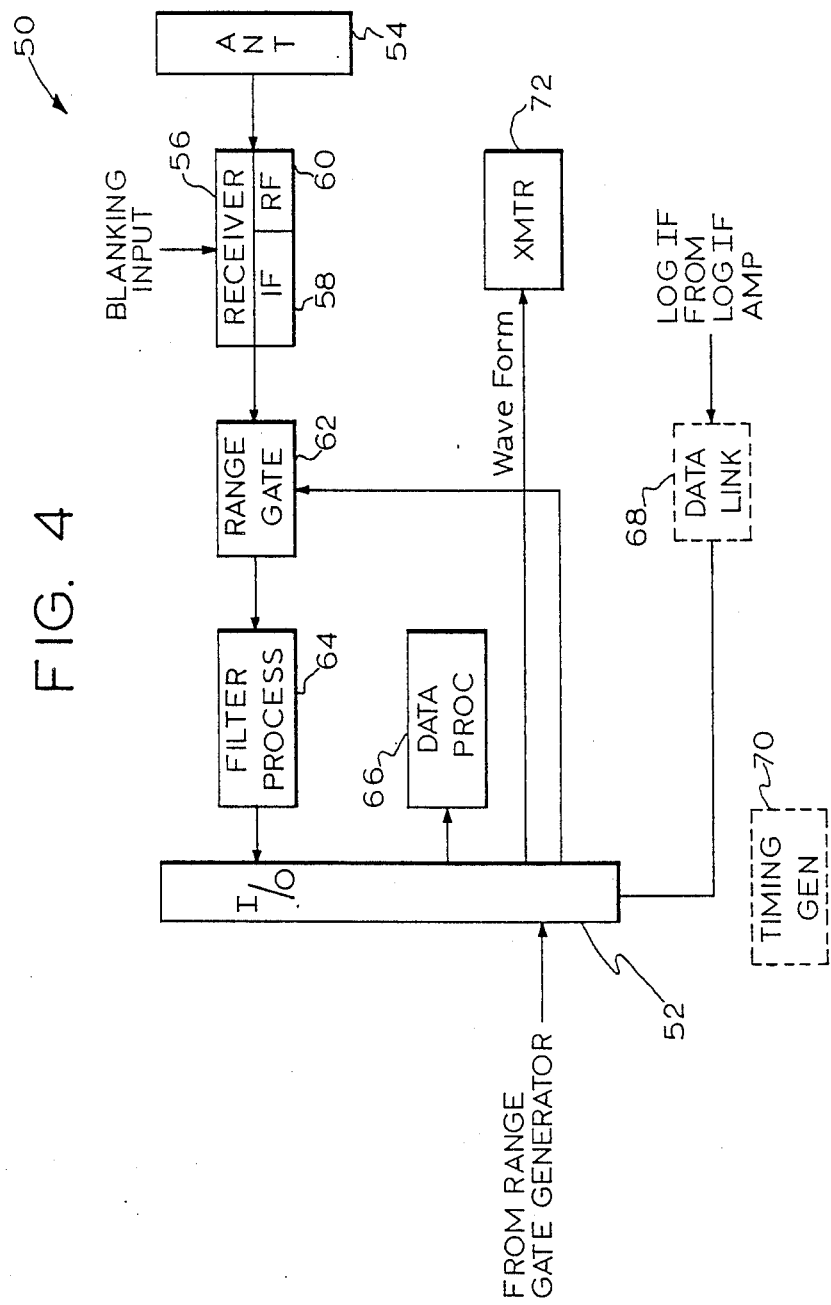
FIG. 4 is a typical implementation of a radar seeker.

The output of the range gate generator 42 is provided to a radar seeker 50 mounted on the platform 8. A typical implementation of a radar seeker is provided in FIG. 4. The seeker 50 includes an I/O circuit 52, a seeker antenna 54, a radar receiver 56 having an IF section 58 and an RF section 60, a range gate circuit 62, a filter processor 64, a data processor 66 and a data link 68. The receiver 56 also receives a blanking input from the PRF filter 40. Shown in phantom are a timing generator 70, typically used in an active system, which is eliminated by used of the bistatic receiver 10 of the present invention. Also shown is a transmitter 72 which would also be used in an active system.

The I/O circuit generates timing control for the range gate circuit 62. Thus, the signals from the range gate generator 42 are input to the I/O circuit 52 and used thereby to set up the range gates within which the return signal, received by the antenna 54 and receiver 56, is placed by the range gate circuit 62. This effectively selectively turns on the receiver 56 and provides an indication of the range of the target from the platform 8 in the manner described more fully below. The output of the range gate circuit 62 is processed by the filter processor 64 and input to the I/O circuit 52. The I/O circuit 52 also receives input from the data link 68 which is shown in phantom in FIG. 4 to indicate that a separate circuit for the data link function is not required by the bistatic receiver 10 of the present invention. In accordance with the present invention, the data link is provided through the log IF output of the log IF amplifier 36 of the bistatic receiver 10. The I/O circuit 52 typically outputs to a data processor 66.

Thus the bistatic receiver 10 provides for the blanking of main lobe signals which can cause receiver desensitization when the platform 8 is in the mainlobe 5 and timing for the range gates.

RANGE DETERMINATION

Figure 5:
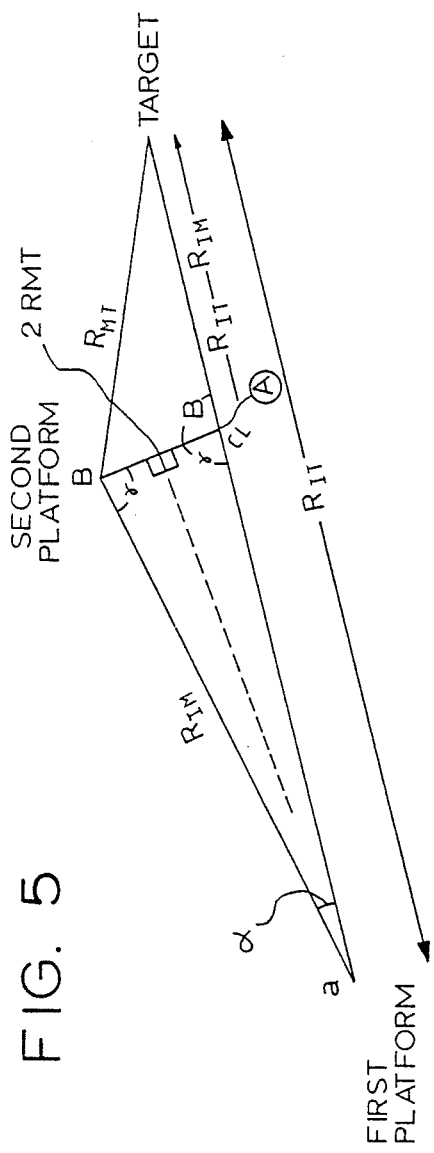
FIG. 5 is a simplified representation of the diagram of FIG. 1 showing the typical positioning of first and second platforms and a target.
Figure 6:
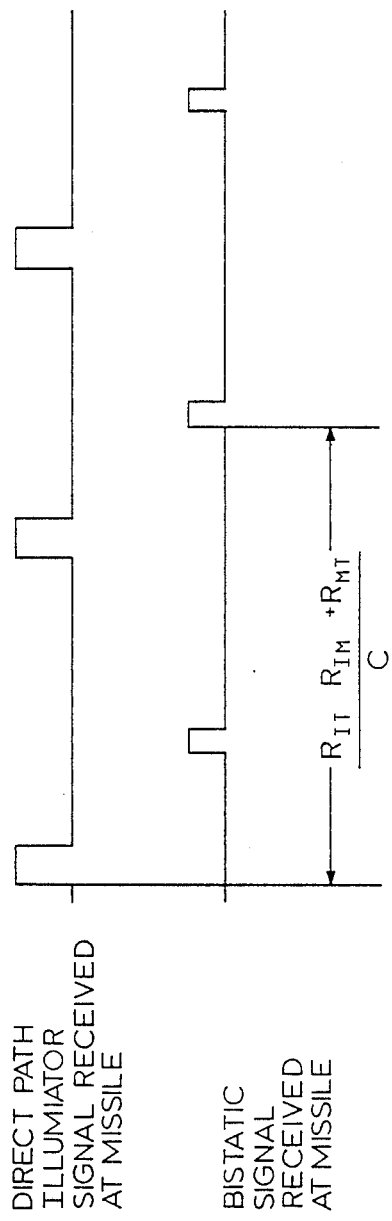
FIG. 6 shows the returns received at the second platform via direct and bistatic (return) paths.

Range determination is provided as follows. FIG. 5 is a simplified representation of the diagram of FIG. 1 showing the typical positioning of the first and second platforms 3 and 8, respectively, and a target 7. FIG. 6 shows the returns received at the second platform 8 via the direct and bistatic (return) paths.

The direct path signal pulse from the transmitter 2 to the second platform 8 travels the distance $R_{IM}$ and the same signal pulse travels an additional distance $(R_{IT} - R_{IM})$ to reach the target 7 plus the distance $R_{MT}$ to reach the second platform 8.

The relative timing of the waveforms is shown in FIG. 6 with a range ambiguity which would be resolved from earlier cuing data supplied to the second platform by the first platform via the data link. This data is derived from the radar located on the first platform where $R_{IM}$ and $R_{IT}$ are measured. Thus, in accordance with the present teachings, the system at the second platform 8 can measure the range $[(R_{IT} - R_{IM}) + R_{MT}]$ where $R_{IT}$ is the distance from the first platform 3 to the target 7, $R_{IM}$ is the distance of the direct path from the first platform to the second platform and $R_{MT}$ is the range from the second platform 8 to the target 7. That is, the system simply counts the time from the receipt of the direct path signal until receipt of the return from the target. This is illustrated in FIG. 6. From these measurements, the range from the second platform to the target $R_{MT}$ may be determined using the values of $R_{IM}$ amd $R_{IT}$ supplied by the system at the second platform 8.

In addition, if the angle separating the two lines-of-sight, i.e. from the first platform 3 to the second platform 8 and from the first platform 3 to the target 7, then if either $R_{IT}$ or $R_{IM}$ is also known $R_{MT}$ can be determined from the bistatic radar measurements as shown below.

Triangle abc is isosceles triangle so that $\gamma = \pi/2 - \alpha 2$ $$\gamma + \beta = \pi = \pi/2 - \alpha/2 + \beta; \beta = \pi/2 + \alpha/2; \cos \beta = -\sin \alpha/2$$

Let $R_{MT} = d_1$, $R_{IT} - R_m = d_2$, $2 R_{IM}\sin \alpha/2 = d_3$
Then $d_1^2 = d_2^2 + d_3^2 - 2 d_2 d_3 \cos \beta$
The sum of $d + d_2$ is obtained from seeker measurements so that $m = d_1 + d_2$ or $d_2 = m - d_1$. Then $$d_1^2 = (m - d_1)^2 + 4R_{IM}^2 \sin^2 \alpha/2 + 2(m - d_1)(2R_{IM}\sin \alpha/2) \sin \alpha/2$$

$$d_1^2 = m^2 - 2md_1 + d_1^2 + 4R_{IM}^2\sin^2 \alpha/2 + 4mR_{IM}\sin^2 \alpha/2 - 4d_1 R_{IM}\sin^2 \alpha/2$$

$$d_1(2m + 4R_{IM}\sin^2 \alpha/2) = m^2 + 4R_{IM}^2\sin^2 \alpha/2 + 4mR_{IM}\sin^2 \alpha/2$$

For small $\alpha$, $\sin \alpha/2 \approx \alpha/2$.

$$\begin{aligned} d_1 &= m^2[1 + R_{IM}\alpha^2/m + R_{IM}^2/m^2\alpha^2]/2m[1 + R_{IM}\alpha^2/2m] \\ &\approx m/2[1 + R_{IM}\alpha^2/m + (R_{IM}/m)^2\alpha^2][1 - R_{IM}/m\alpha^2/2 + \ldots] \\ &\approx m/2[1 - (R_{IM}/m)\alpha^2/2 + (R_{IM}/m)\alpha^2 - (R_{IM}/m)^2\alpha^4/2 \\ &\quad + (R_{IM}/m)^2\alpha^2 - (R_{IM}/m)^3\alpha^4/2 + \ldots \\ &\approx m/2 [1 + \alpha^2(R_{IM}/2m + (R_{IM}/m)^2) - \alpha^4/2 [(R_{IM}/m)^2 \\ &\quad + (R_{IM}/m)^3)] \end{aligned}$$

Using a similar analysis $R_{MT}$ can be expressed in terms of $R_{IT}$, m and $\alpha$ as $$d_1 = R_{MT} \approx m/2 [1 - 2\alpha R_{IT}/m]$$

The timing of the receipt of the bistatic return signal relative to the time of arrival of the direct path pulse at the missile provides an indication of when it would be appropriate to switch PRFs to avoid eclipsing loss. The seeker is blanked during the time the direct pulse is present at the missile. If this timing corresponds to when the bistatic target return arrives at the second platform 8, the seeker receiver 50 would be eclipsed and should be operating at a different PRF. The seeker receiver 50 can detect the onset of this condition and with a down link from the missile back to the illuminator can request a new PRF. The seeker receiver 50 can select the new PRF based on the need to avoid eclipsing but also avoiding main lobe clutter.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A semi-active radar receiver for receiving a sequence of radar pulses from a radar transmitter remotely located on a first platform and providing radar timing signals in response thereto, said semi-active receiver comprising:
   receiver means mounted on a second platform for receiving a direct transmission of a series of radar pulses from said radar transmitter and for providing a series of first signal pulses in response thereto, said receiving means including filter means for deriving estimates of the timing of the receipt of said transmitted pulses and providing said series of first pulses corresponding to said estimates; and range gate generator means for processing said series of first pulses to provide said radar timing signals.

2. A semi-active radar receiver for receiving a sequence of radar pulses from a radar transmitter remotely located on a first platform and providing radar timing signals in response thereto, said semi-active receiver comprising:
   receiver means mounted on a second platform for receiving a direct transmission of a series of radar pulses from said radar transmitter and for providing a series of first signal pulses in response thereto;
   filter means for deriving estimates of the timing of the receipt of said transmitted pulses based on the processing of said series of first signal pulses and providing a series of second pulses corresponding to said estimates; and
   range gate generator means for processing said series of second pulses to provide said radar timing signals.

3. The invention of claim 2 wherein said receiver means includes a log amplifier.

4. The invention of claim 3 wherein said receiver means includes a threshold circuit.

5. The invention of claim 4 wherein said receiver means includes means for downconverting said transmitted signal.

6. The invention of claim 2 wherein said filter means includes a digital filter.

7. The invention of claim 6 wherein said filter means includes a bandpass filter.

8. The invention of claim 7 wherein said filter means includes means for providing a blanking pulse for deactivating a seeker receiver.

9. The invention of claim 7 wherein said range gate generator means includes means for providing a pulse effective to reactivate said seeker receiver.

10. A semi-active radar receiver for receiving a sequence of radar pulses and providing radar timing signals in response thereto, said semi-active receiver comprising:
   receiver means for receiving a direct transmission of a series of pulses from a radar transmitter and for providing a series of first signal pulses in response thereto, said receiver means including downconverter means for downconverting said series of pulses, a log amplifier connected to said downconverter means, and a thresholding circuit connected to the output of said log amplifier;

filter means for deriving estimates of the timing of the receipt of said transmitted pulses based on the processing of said series of first signal pulses and providing a series of second pulses corresponding to said estimates, said filter means including means for averaging said series of first pulses; and range gate generator means for processing said series of second pulses to provide said radar timing signals.

11. The invention of claim 9 wherein said filter means includes a bandpass filter.

12. The invention of claim 11 wherein said filter means includes means for providing a blanking pulse for deactivating a seeker receiver.

13. The invention of claim 12 wherein said range gate generator means includes means for providing a pulse effective to reactivate said seeker receiver.

* * * * *